United States Patent
Heikkila

(10) Patent No.: US 8,111,742 B2
(45) Date of Patent: Feb. 7, 2012

(54) DATA PROCESSING METHOD, EQUALIZER, RECEIVER, COMMUNICATION SYSTEM, NETWORK ELEMENT, AND TERMINAL USING SIMPLIFIED CHANNEL MATRIX INVERSION

(75) Inventor: Markku J. Heikkila, Oulu (FI)

(73) Assignee: Nokia Corporation, Espoo (FI)

( * ) Notice: Subject to any disclaimer, the term of this patent is extended or adjusted under 35 U.S.C. 154(b) by 964 days.

(21) Appl. No.: 11/887,826

(22) PCT Filed: Apr. 7, 2005

(86) PCT No.: PCT/FI2005/050114
§ 371 (c)(1),
(2), (4) Date: Oct. 4, 2007

(87) PCT Pub. No.: WO2006/106171
PCT Pub. Date: Oct. 12, 2006

(65) Prior Publication Data
US 2009/0052513 A1    Feb. 26, 2009

(51) Int. Cl.
*H03H 7/30* (2006.01)
(52) U.S. Cl. ......................... 375/230; 375/346
(58) Field of Classification Search ............ 375/346, 375/348, 285, 148, 150, 152, 229, 230, 232; 455/63.1
See application file for complete search history.

(56) References Cited

U.S. PATENT DOCUMENTS

| 6,922,445 B1 * | 7/2005 | Sampath et al. | 375/267 |
| 2003/0125090 A1 * | 7/2003 | Zeira | 455/562 |
| 2003/0185174 A1 | 10/2003 | Currivan et al. | |
| 2003/0218973 A1 * | 11/2003 | Oprea et al. | 370/210 |
| 2004/0228392 A1 | 11/2004 | Zhang et al. | |
| 2005/0025267 A1 * | 2/2005 | Reznik et al. | 375/346 |
| 2005/0101259 A1 | 5/2005 | Tong et al. | |
| 2009/0097598 A1 * | 4/2009 | Lee et al. | 375/346 |
| 2009/0109947 A1 * | 4/2009 | Sheng et al. | 370/342 |

OTHER PUBLICATIONS

Guo et al, "Scalable FPGA Architectures for LMMSE-based SIMO Chip Equalizer in HSDPA Downlink", Nokia Research Centre, Rice University, 2003, IEEE.*
Baynast et al, "Chip-level LMMSE Equalization for Downlink MIMO CDMA in Fast Fading Environments", Rice University, Houston, Texas, 2004 IEEE.*
Jianzhong Zhang, Tejas Bhatt and Giridhar Mandyam, "Efficient Linear Equalization for High Data Rate Downlink CDMA Signaling", Nokia Research Centre, IEEE, 2003.*
Walke et al., "Multi-antenna wireless base stations in TD/CDMA communications systems", VTC 2000, IEEE VTS fall 2000, Sep. 24-28, 2000, vol. 6, pp. 2767-2774.

* cited by examiner

*Primary Examiner* — Chieh M Fan
*Assistant Examiner* — Aristocratis Fotakis
(74) *Attorney, Agent, or Firm* — Squire, Sanders & Dempsey (US) LLP

(57) ABSTRACT

The invention is related to a communication terminal, comprising: means (618) for creating at least one channel matrix assuming predetermined interfering signals as a part of a desired signal; means (618) for dividing the at least one channel matrix into multiple sub-matrices; means (618) for diagonalizing the sub-matrices by using a transformation matrix; means (618) for forming at least one block-diagonalized matrix using diagonalized sub-matrices; means (618) for inverting the at least one block-diagonalized matrix; and means (618) for generating channel equalizer coefficients by using at least one inverted block-diagonalized matrix.

21 Claims, 3 Drawing Sheets

Figure 1:
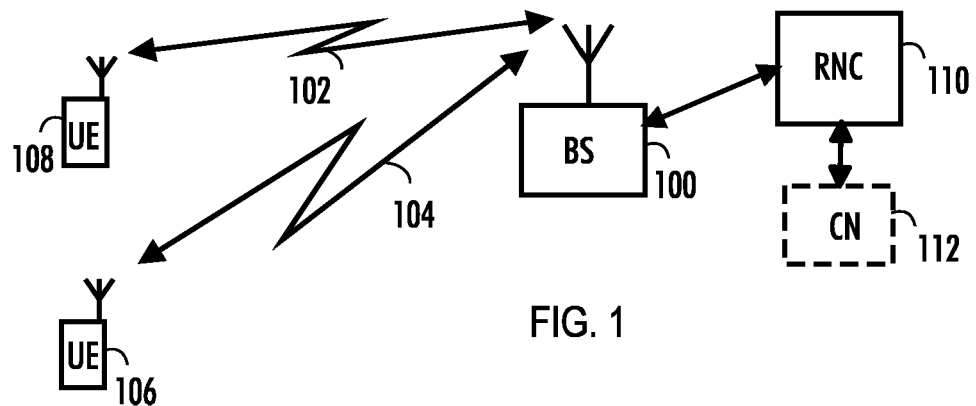

DATA PROCESSING METHOD, EQUALIZER, RECEIVER, COMMUNICATION SYSTEM, NETWORK ELEMENT, AND TERMINAL USING SIMPLIFIED CHANNEL MATRIX INVERSION

FIELD

The invention relates to a data processing method in a receiver of a communication system, an equalizer, a receiver, a communication system, a network element, a communication terminal and a computer program product.

BACKGROUND

In wireless communication systems, one of the biggest challenges is the increasing need to convey high capacity traffic. For instance, the use of multimedia is increasing. Therefore several different techniques to increase the capacity of communication systems have been presented, such as multiple-input multiple output (MIMO) and space-time transmit diversity (STTD) techniques. Systems based on using multiple antennas are one of the most promising techniques for achieving high data rates for instance in high-speed downlink packet access (HSDPA) systems.

Typically in multi-antenna systems, a transmitter has a plurality of antennas, each of which transmits using the same frequency band and, in the case of wide band code division access (WCDMA) systems, possibly also using the same spreading code. Thus inter-antenna interference becomes very strong and has to be suppressed in a receiver.

A problem is that multi-antenna transmission on a transmitter side and/or multiple antennas on a receiver side cause a large complexity increase in solving coefficients for a channel equalizer of a receiver.

BRIEF DESCRIPTION OF THE INVENTION

According to an aspect of the invention, there is provided a data processing method in a receiver of a communication system, the method comprising: creating at least one channel matrix assuming predetermined interfering signals as a part of a desired signal; dividing the at least one channel matrix into multiple sub-matrices; diagonalizing the sub-matrices by using a transformation matrix; forming at least one block-diagonalized matrix using diagonalized sub-matrices; inverting the at least one block-diagonalized matrix; and generating channel equalizer coefficients by using at least one inverted block-diagonalized matrix.

According to another aspect of the invention, there is provided a data processing method in a receiver of a communication system, the method comprising: creating at least one channel matrix assuming predetermined interfering signals as a part of a desired signal; creating at least one block matrix by using the at least one channel matrix and determining sub-matrices of the at least one block matrix; diagonalizing the sub-matrices for generating at least one block-diagonalized matrix; inverting the at least one block-diagonalized matrix; and generating channel equalizer coefficients by using at least one inverted block-diagonalized matrix.

According to another aspect of the invention, there is provided an equalizer, comprising: means for creating at least one channel matrix assuming predetermined interfering signals as a part of a desired signal; means for dividing the at least one channel matrix into multiple sub-matrices; means for diagonalizing the sub-matrices by using a transformation matrix; means for forming at least one block-diagonalized matrix using diagonalized sub-matrices; means for inverting the at least one block-diagonalized matrix; and means for generating channel equalizer coefficients by using at least one inverted block-diagonalized matrix.

According to another aspect of the invention, there is provided an equalizer, comprising: means for creating at least one channel matrix assuming predetermined interfering signals as a part of a desired signal; means for creating at least one block matrix by using the at least one channel matrix and determining sub-matrices of the at least one block matrix; means for diagonalizing the sub-matrices for generating at least one block-diagonalized matrix; means for inverting the at least one block-diagonalized matrix; and means for generating channel equalizer coefficients by using at least one inverted block-diagonalized matrix.

According to another aspect of the invention, there is provided a receiver, comprising: means for creating at least one channel matrix assuming predetermined interfering signals as a part of a desired signal; means for dividing the at least one channel matrix into multiple sub-matrices; means for diagonalizing the sub-matrices by using a transformation matrix; means for forming at least one block-diagonalized matrix using diagonalized sub-matrices; means for inverting the at least one block-diagonalized matrix; and means for generating channel equalizer coefficients by using at least one inverted block-diagonalized matrix.

According to another aspect of the invention, there is provided a receiver, comprising: means for creating at least one channel matrix assuming predetermined interfering signals as a part of a desired signal; means for creating at least one block matrix by using the at least one channel matrix and determining sub-matrices of the at least one block matrix; means for diagonalizing the sub-matrices for generating at least one block-diagonalized matrix; means for inverting the at least one block-diagonalized matrix; and means for generating channel equalizer coefficients by using at least one inverted block-diagonalized matrix.

According to another aspect of the invention, there is provided a communication system, comprising: means for creating at least one channel matrix assuming predetermined interfering signals as a part of a desired signal; means for dividing the at least one channel matrix into multiple sub-matrices; means for diagonalizing the sub-matrices by using a transformation matrix; means for forming at least one block-diagonalized matrix using diagonalized sub-matrices; means for inverting the at least one block-diagonalized matrix; and means for generating channel equalizer coefficients by using at least one inverted block-diagonalized matrix.

According to another aspect of the invention, there is provided a communication system, comprising: means for creating at least one channel matrix assuming predetermined interfering signals as a part of a desired signal; means for creating at least one block matrix by using the at least one channel matrix and determining sub-matrices of the at least one block matrix; means for diagonalizing the sub-matrices for generating at least one block-diagonalized matrix; means for inverting the at least one block-diagonalized matrix; and means for generating channel equalizer coefficients by using at least one inverted block-diagonalized matrix.

According to another aspect of the invention, there is provided a network element, comprising: means for creating at least one channel matrix assuming predetermined interfering signals as a part of a desired signal; means for dividing the at least one channel matrix into multiple sub-matrices; means for diagonalizing the sub-matrices by using a transformation matrix; means for forming at least one block-diagonalized matrix using diagonalized sub-matrices; means for inverting the at least one block-diagonalized matrix; and means for generating channel equalizer coefficients by using at least one inverted block-diagonalized matrix.

According to another aspect of the invention, there is provided a network element, comprising: means for creating at least one channel matrix assuming predetermined interfering signals as a part of a desired signal; means for creating at least one block matrix by using the at least one channel matrix and determining sub-matrices of the at least one block matrix; means for diagonalizing the sub-matrices for generating at least one block-diagonalized matrix; means for inverting the at least one block-diagonalized matrix; and means for generating channel equalizer coefficients by using at least one inverted block-diagonalized matrix.

According to another aspect of the invention, there is provided a communication terminal, comprising: means for creating at least one channel matrix assuming predetermined interfering signals as a part of a desired signal; means for dividing the at least one channel matrix into multiple sub-matrices; means for diagonalizing the sub-matrices by using a transformation matrix; means for forming at least one block-diagonalized matrix using diagonalized sub-matrices; means for inverting the at least one block-diagonalized matrix; and means for generating channel equalizer coefficients by using at least one inverted block-diagonalized matrix.

According to another aspect of the invention, there is provided a communication terminal, comprising: means for creating at least one channel matrix assuming predetermined interfering signals as a part of a desired signal; means for creating at least one block matrix by using the at least one channel matrix and determining sub-matrices of the at least one block matrix; means for diagonalizing the sub-matrices for generating at least one block-diagonalized matrix; means for inverting the at least one block-diagonalized matrix; and means for generating channel equalizer coefficients by using at least one inverted block-diagonalized matrix.

According to another aspect of the invention, there is provided a computer program product encoding a computer program of instructions for executing a computer process for processing data, the process comprising: creating at least one channel matrix assuming predetermined interfering signals as a part of a desired signal; dividing the at least one channel matrix into multiple sub-matrices; diagonalizing the sub-matrices by using a transformation matrix; forming at least one block-diagonalized matrix using diagonalized sub-matrices; inverting the at least one block-diagonalized matrix; and generating channel equalizer coefficients by using at least one inverted block-diagonalized matrix.

According to another aspect of the invention, there is provided a computer program product encoding a computer program of instructions for executing a computer process for processing data, the process comprising: creating at least one channel matrix assuming predetermined interfering signals as a part of a desired signal; creating at least one block matrix by using the at least one channel matrix and determining sub-matrices of the at least one block matrix; diagonalizing the sub-matrices for generating at least one block-diagonalized matrix; inverting the at least one block-diagonalized matrix; and generating channel equalizer coefficients by using at least one inverted block-diagonalized matrix.

The invention provides several advantages. Some embodiments of the invention provide a low complexity method and apparatus for solving channel equalizer coefficients. The performance of the method and the apparatus is at least very near to the performance of prior art equalizers but the complexity is significantly lower. The lower complexity is mainly achieved by simplifying channel matrix inversion.

LIST OF DRAWINGS

Figure 4:
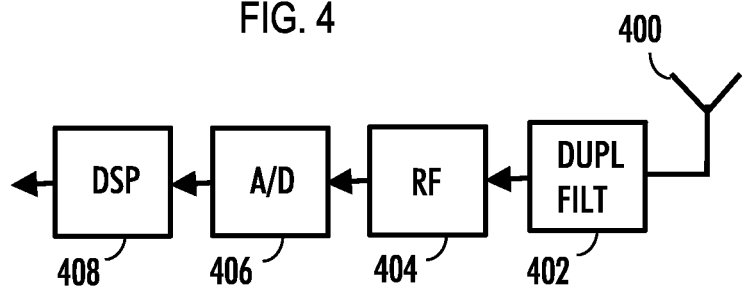
Figure 5:
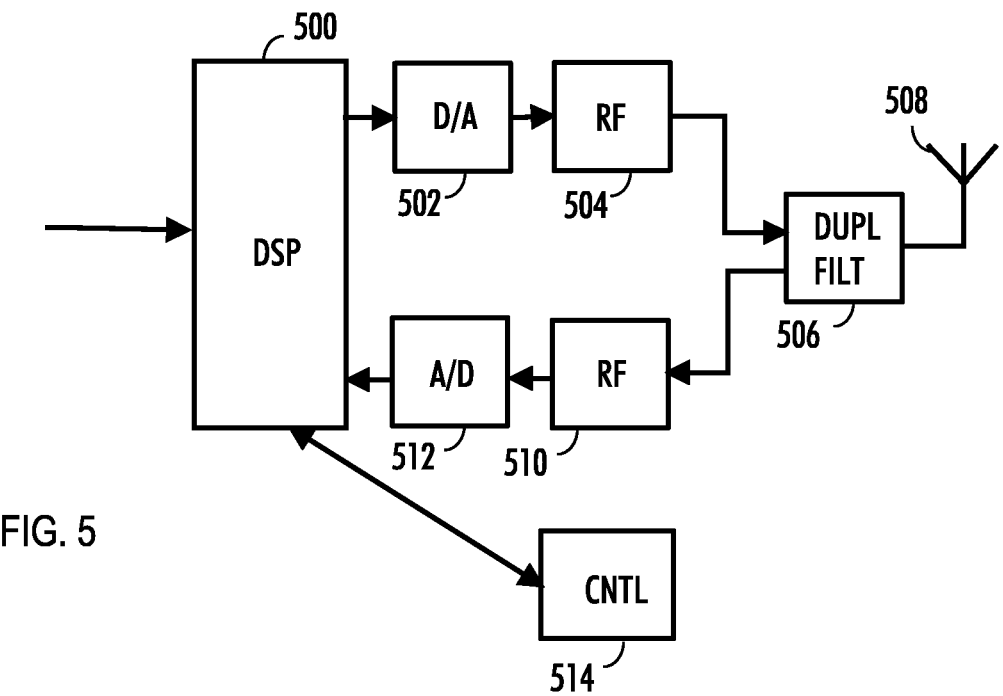
Figure 2:
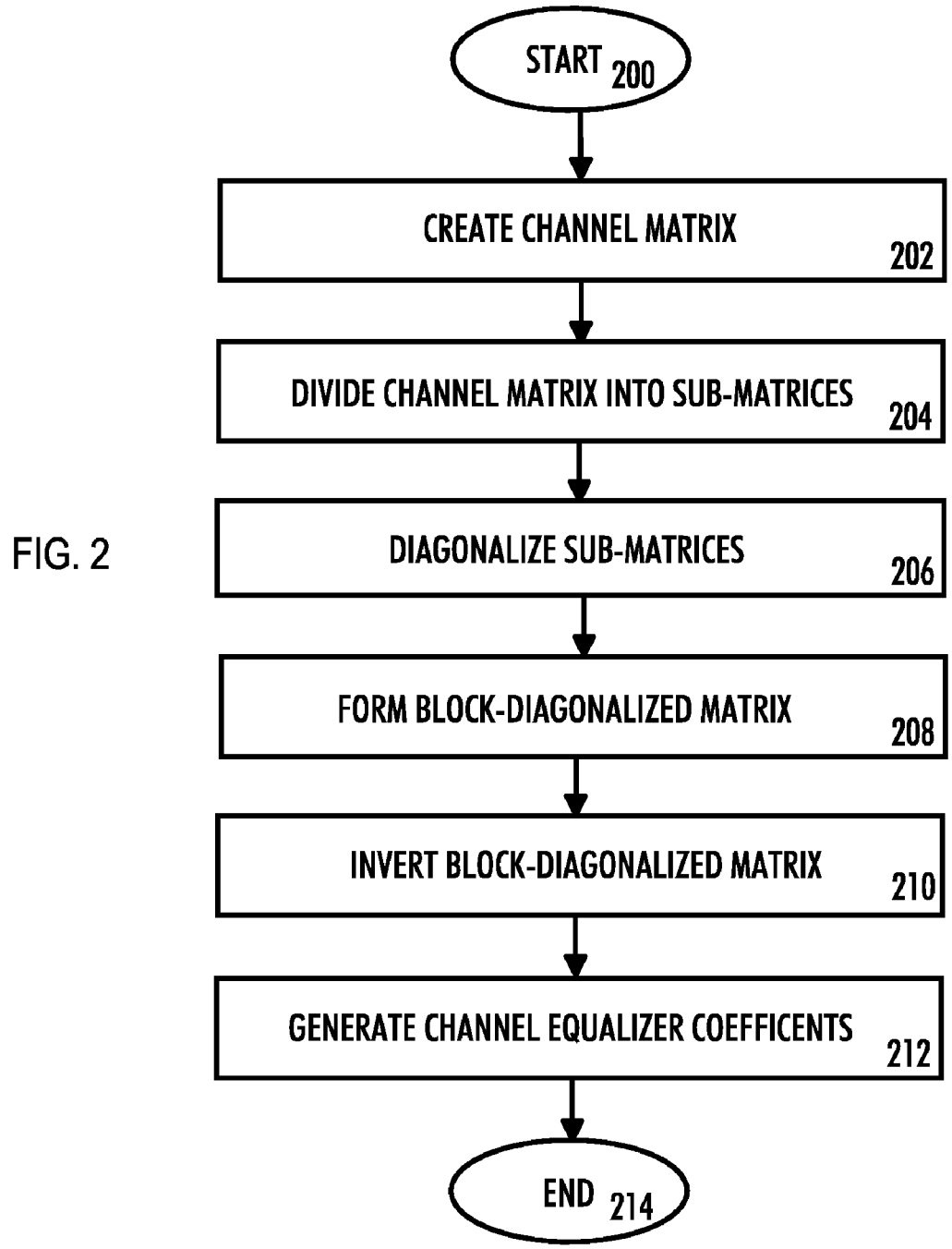
Figure 3:
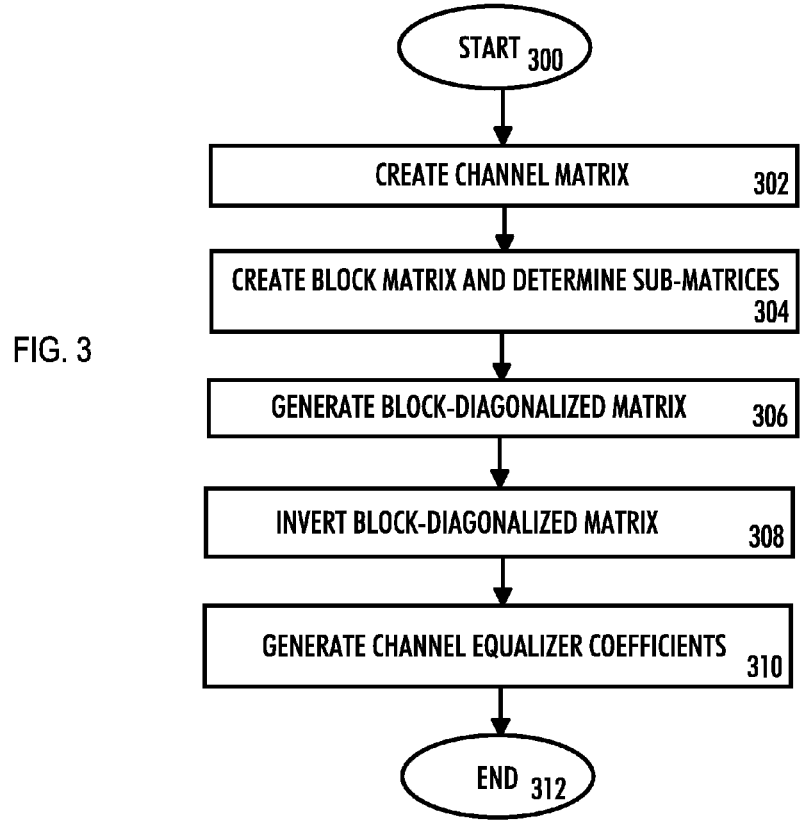
Figure 6:
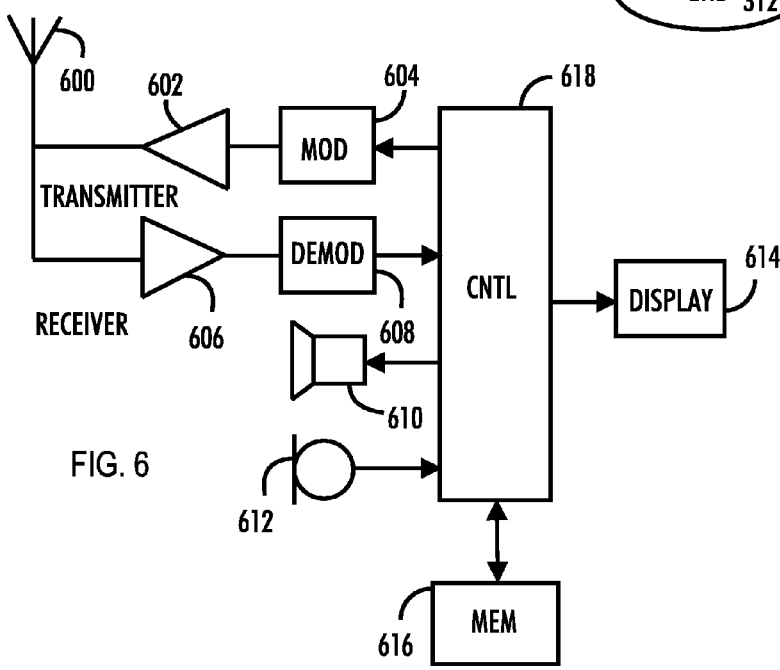

In the following, the invention will be described in greater detail with reference to the embodiments and the accompanying drawings, in which FIG. 1 shows an example of a communication system;
FIG. 2 is a flow chart;
FIG. 3 is another flow chart;
FIG. 4 illustrates an example of a receiver;
FIG. 5 shows an example of a part of a network element; and
FIG. 6 shows an example of a communication terminal.

DESCRIPTION OF EMBODIMENTS

With reference to FIG. 1, we examine an example of a communication system in which embodiments of the invention can be applied. The present invention can be applied to various communication systems. One example of such a communication system is Universal Mobile Telecommunications System (UMTS) radio access network. It is a radio access network which includes wideband code division multiple access (WCDMA) technology and can also offer real-time circuit and packet switched services. The embodiments are not, however, restricted to the systems given as examples but a person skilled in the art may apply the solution in other communication systems provided with the necessary properties.

It is clear to a person skilled in the art that the method according to the invention can be applied to systems utilizing different modulation methods or air interface standards.

FIG. 1 is a simplified illustration of a part of a digital data transmission system to which the solution according to the invention is applicable. This is a part of a cellular radio system, which comprises a base station (or a node B) 100, which has bidirectional radio links 102 and 104 to user terminals 106 and 108. The user terminals may be fixed, vehicle-mounted or portable. The base station includes transceivers, for instance. From the transceivers of the base station, there is a connection to an antenna unit that establishes the bidirectional radio links to the user terminal. The base station is further connected to a controller 110, such as a radio network controller (RNC), which transmits the connections of the terminals to the other parts of the network. The radio network controller controls in a centralized manner several base stations connected to it. The radio network controller is further connected to a core network 112 (CN). Depending on the system, the counterpart on the CN side can be a mobile services switching centre (MSC), a media gateway (MGW) or a serving GPRS (general packet radio service) support node (SGSN).

The radio system can also communicate with other networks, such as a public switched telephone network or the Internet.

The size of communication systems can vary according to the data transfer needs and to the required coverage area.

Next, by means of FIG. 2, an embodiment of a data processing method in a receiver of a communication system is explained in further detail.

The embodiment presents a low complexity algorithm for solving equalizer filter coefficients (taps) in a multi-antenna system such as MIMO or STTD. In the embodiment, a channel matrix includes selected interfering antenna signals as a part of a desired signal. The channel matrix is modified in such a way that the matrix to be inverted includes N times N sub-matrices, wherein N is the number of parallel data streams in the multi-antenna system.

The embodiment can be applied to equalization of for instance STTD, MIMO, systems using eigenbeamforming and different kinds of Bell Laboratories layered space-time, BLAST, systems (such as vertical Bell Laboratories layered space-time (V-BLAST)). Attention should be paid to the fact that the embodiment is also applicable to systems where no plurality of transmission antennas is necessarily provided but the interfering signal is transmitted from another transmitting device such as a base station. Then the interfering signal can be suppressed in a manner similar to that used in connection with the unwanted antenna signals of a multi-antenna system.

The embodiment starts in block 200. When describing the embodiment, an example of a two-antenna transmission is used for the sake of clarity. However, it is obvious for a person skilled in the art that the number of transmission and reception antennas may vary.

In block 202, at least one channel matrix is created. While creating the at least one channel matrices, predetermined interfering signals are considered as a part of a desired signal. That is to say, selected interfering signals are not considered as a part of additive noise. Other noise or interference is approximated as white noise.

Channel matrices are usually created on the basis of estimated channel coefficients which may include effects of various transmitter and receiver filters, such as a transmit pulse shaping filter. Typically, in a multi-antenna system, a channel matrix H is created for each of the radio channels or for each of the transmission antennas. Each channel matrix is then processed individually.

In this embodiment, channel matrices are typically created for selected antennas, usually for all transmission antennas. In the case of multiple reception antennas, channel matrices typically include channels from one transmission antenna to all reception antennas.

The signal received from two transmit antennas can be expressed as follows:

$$r = (H_{tx1} \; H_{tx2}) \begin{pmatrix} d_1 \\ d_2 \end{pmatrix} + n, \quad (1)$$

wherein
$H_{tx1}$ denotes a channel matrix of the signal transmitted from the first antenna,
$H_{tx2}$ denotes a channel matrix of the signal transmitted from the second antenna,
$d_1$ denotes the signal transmitted by the first antenna,
$d_2$ denotes the signal transmitted by the second antenna, and
n denotes a noise vector.

Attention should be paid to the fact that $$(H_{tx1} \; H_{tx2}) \begin{pmatrix} d_1 \\ d_2 \end{pmatrix}$$

is a multi-path propagated desired signal.

Since the inter-antenna interference is modelled above as a part of the desired signal, it can be assumed that n, in addition to the noise, also includes interference other than the inter-antenna interference of the received signal (such as inter-cell interference).

Thus a linear minimum mean-square error (LMMSE) equalizer for the signal transmitted from transmission antennas m=1, 2 can be expressed as:

$$w_m = (H_{tx1} \; H_{tx2}) \left( \sigma^2 I + \begin{pmatrix} H_{tx1}^H H_{tx1} & H_{tx1}^H H_{tx2} \\ H_{tx2}^H H_{tx1} & H_{tx2}^H H_{tx2} \end{pmatrix} \right)^{-1} e_{D(m)}, \quad (2)$$

wherein
$H_{tx1}$ denotes a channel matrix of the signal transmitted from the first antenna,
$H_{tx2}$ denotes a channel matrix of the signal transmitted from the second antenna,
$\sigma^2 I$ denotes a diagonal matrix multiplied by variance of additive white noise,
H denotes complex-conjugate transpose i.e. Hermitian matrix,
$e_{D(m)}$ is a unit vector with "1" in D(m)'th position, and $D(m)$ is a positive integer that is specific to the transmission antenna to be equalized. It determines the position of the unity in the unit vector $e_{D(m)}$ and thus also determines the column of an inverse matrix in equation (2) which is used for obtaining the equalizer filter coefficients.

Interference other than the inter-antenna interference has been considered as white noise with variance $\sigma^2$. The contribution of the noise term can therefore be taken into account by adding matrix $\sigma^2 I$ to the matrix $$\begin{pmatrix} H_{tx1}^H H_{tx1} & H_{tx1}^H H_{tx2} \\ H_{tx2}^H H_{tx1} & H_{tx2}^H H_{tx2} \end{pmatrix}.$$

In multi-antenna systems, each parallel data stream acts as a coloured interference to other data streams. Nevertheless, the white noise assumption can be made since other data streams, which are the main source of interference in MIMO communication systems, are considered as a part of a desired signal.

In block 204, the at least one channel matrix is divided into multiple sub-matrices. Typically, each channel matrix is divided into multiple circulant and convolutional sub-matrices. The circulant matrix can be formed of one single row vector of an original matrix (in this case, the original matrix being a sub-matrix $H_{txm,i}$ of matrix $H_{txm}$ as shown in equation (5)) by circularly rotating the row vector to form other rows of the circulant matrix.

Hence the matrix inversion can be carried out in block 210 by N conjugate symmetric 2-by-2 matrix inversions which reduces computational complexity. Fourier operations can be carried out by using Fast Fourier Algorithm (FFT). FFT is known in prior art.

In block 206, the sub-matrices are diagonalized by using a transformation matrix. As a transformation matrix may be selected several kinds of matrices. One example is a linear transformation matrix used in the discrete Fourier Transform (the matrix is marked with D in equations (3), (4) and (5)). The discrete Fourier transform (DFT) is widely used for linear filtering applications, therefore it is not explained in further detail herein.

The diagonalization can be carried out by starting from equation:

$$H_{txm}^H H_{txn} \approx G_{mn} = D^H U_{mn} D, \quad (3)$$

wherein
D denotes a transformation matrix, such as Fourier-matrix,
H denotes complex-conjugate transpose,
$U_{mn}$ denotes a diagonal matrix the values of which are obtained as shown in equation (6) below, and
$mn$ define the position of the matrix inside a larger matrix (column, row).

Thus equation (2) can be approximated as follows:

$$\approx (H_{tx1} \quad H_{tx2}) \begin{pmatrix} \sigma^2 I + G_{11} & G_{12} \\ G_{21} & \sigma^2 I + G_{22} \end{pmatrix}^{-1} e_{D(m)} \quad (4)$$

$$= (H_{tx1} \quad H_{tx2}) \begin{pmatrix} \sigma^2 I + D^H U_{11} D & D^H U_{12} D \\ D^H U_{21} D & \sigma^2 I + D^H U_{22} D \end{pmatrix}^{-1} e_{D(m)}$$

$$= (H_{tx1} \quad H_{tx2}) \begin{pmatrix} D^H & 0 \\ 0 & D^H \end{pmatrix} \begin{pmatrix} \sigma^2 I + U_{11} & U_{12} \\ U_{21} & \sigma^2 I + U_{22} \end{pmatrix}^{-1} \begin{pmatrix} D & 0 \\ 0 & D \end{pmatrix} e_{D(m)},$$

wherein
$H_{tx1}$ denotes a channel matrix of a signal transmitted from a first antenna,
$H_{tx2}$ denotes a channel matrix of a signal transmitted from a second antenna,
$\sigma^2 I$ denotes an identity matrix multiplied by noise variance,
$e_{D(m)}$ is a unit vector, with "1" in D(m)'th position, and
$D(m)$ is a positive integer that is specific to the transmission antenna to be equalized. It determines the position of the unity in the unit vector $e_{D(m)}$ and thus also determines the column of an inverse matrix in equation (2) which is used to obtain the equalizer filter coefficients,
$G_{mn}$ is obtained from equation (3),
D denotes a transformation matrix,
H denotes a complex-conjugate transpose,
$U_{mn}$ denotes a diagonal matrix the values of which are obtained as shown in equation (6) below, and
$mn$ define the position of the matrix inside a larger matrix.

A discrete Fourier transform (DFT) is typically calculated by using a fast Fourier transform (FFT), which is known in prior art and therefore is not explained in greater detail herein.

Matrices $H_{txm}$ represent channels from each transmission antenna m to reception antennas, and thus matrices $H_{txm}$ can be separated into multiple sub-matrices corresponding to each reception antenna and chip-level sample. For example, assuming two reception antennas (Nrx=2) and a sampling rate of two samples per chip (Ns=2) at the receiver, a channel matrix can be further written as:

$$H_{txm} = \begin{pmatrix} H_{txm,1} \\ H_{txm,2} \\ \vdots \\ H_{txm,NrxNs} \end{pmatrix}. \quad (5)$$

The channel matrix is separated into NrxNs submatrices, each corresponding to a certain reception antenna and a certain chip-sampling instant. Equation (3) gives $$H_{txm}^H H_{txn} = \sum_{i=1}^{N_{rx}N_s} H_{txm,i}^H H_{txn,i} \quad (6)$$

-continued $$\approx \sum_{i=1}^{N_{rx}N_s} (D^H \Lambda_{m,i} D)^H (D^H \Lambda_{n,i} D)$$

$$= D^H \left( \sum_{i=1}^{N_{rx}N_s} \Lambda_{m,i}^H \Lambda_{n,i} \right) D$$

$$= D^H U_{mn} D$$

$$= G_{mn},$$

wherein
D denotes a transformation matrix, such as a Fourier-matrix,
H denotes a complex-conjugate transpose,
$U_{mn}$ denotes a diagonal matrix the values of which are obtained as shown in equation (6) below, and
$mn,m,n$ define the position of the matrix inside a larger matrix (column, row),
$N_{rx}$ denotes the number of reception antennas,
$N_S$ denotes the number of samples per chip,
i denotes an index defining a reception antenna and a chip sample index,
$\Sigma$ denotes a summing operation,
i is an index, and
$\Lambda$ matrices are diagonal (see equation (8)).

Equation (6) means that each sub-matrix of the channel matrix is first approximated as a circulant matrix and then diagonalized by Fourier matrix D. This is one technique to (indirectly) perform the diagonalization of the sub-matrices of the matrix to be inverted in equation (2) to obtain the form depicted in equation (4).

After diagonalization of sub-matrices, matrix $$\begin{pmatrix} \sigma^2 I + U_{11} & U_{12} \\ U_{21} & \sigma^2 I + U_{22} \end{pmatrix}^{-1}$$

of equation (4) can be expressed as:

$$\begin{pmatrix} \sigma^2 I + \sum_{i=1}^{N_{rx}N_s} \Lambda_{1,i}^H \Lambda_{1,i} & \sum_{i=1}^{N_{rx}N_s} \Lambda_{1,i}^H \Lambda_{2,i} \\ \sum_{i=1}^{N_{rx}N_s} \Lambda_{2,i}^H \Lambda_{1,i} & \sigma^2 I + \sum_{i=1}^{N_{rx}N_s} \Lambda_{2,i}^H \Lambda_{2,i} \end{pmatrix}^{-1}, \quad (7)$$

wherein
$N_{rx}$ denotes the number of reception antennas,
$N_S$ denotes the number of samples per chip,
i denotes an index defining a reception antenna and chip sample index,
$\sigma^2 I$ denotes an identity matrix multiplied by noise variance,
H denotes a complex-conjugate transpose, and
$\Sigma$ denotes a summing operation.

Additionally, all $\Lambda$ matrices are diagonal and defined as:

$$\Lambda_{m,j} = \text{diag}(FFT(h_{txm,i})), i=1,2,\ldots,N_S N_{rx}, \quad (8)$$

wherein
diag denotes a diagonal matrix with an argument vector as a diagonal,
FFT denotes a fast Fourier transform,
$h_{txm,i}$ denotes a channel vector formed as a column of channel matrix $H_{txm,i}$, i denotes an index, $N_{rx}$ denotes the number of reception antennas, and $N_S$ denotes the number of samples per chip.

The circulant approximation and diagonalization based on FFT as described above can also be applied to multiplication by the channel matrix ($H_{tx1}$ $H_{tx2}$). Therefore, convolution operations, which otherwise would be needed to perform the matrix multiplication, are not necessarily required.

In block 208, at least one block-diagonalized matrix is formed using diagonalized sub-matrices. Typically, diagonalized sub-matrices are arranged into a larger matrix including N times N sub-matrices, wherein N is the number of parallel data streams in a multi-antenna system.

In block 210, the at least one block-diagonalized matrix is inverted. The original matrix inversion has changed into an inversion of a matrix that has only a couple, typically three, non-zero diagonals. Thus, the inversion can be implemented as M matrix inversions of size 2×2, where M is the dimension of the sub-matrices.

In block 212, channel equalizer coefficients are generated by using at least one inverted block-diagonalized matrix.

Equalizer coefficients can be obtained by performing the operations given by the last expression of equation (4). Since the block-diagonalized matrix has already been inverted possibly using the expression given by (7), it will suffice to first perform multiplication:

$$\begin{pmatrix} p_1 \\ p_2 \end{pmatrix} = \begin{pmatrix} \sigma^2 I + U_{11} & U_{12} \\ U_{21} & \sigma^2 I + U_{11} \end{pmatrix}^{-1} \begin{pmatrix} D & 0 \\ 0 & D \end{pmatrix} e_{D(m)}, \quad (9)$$

wherein $\sigma^2 I$ denotes an identity matrix multiplied by noise variance, $e_{D(m)}$ is a unit vector, with "1" in D(m)'th position, and $_{D(m)}$ is a positive integer specific to the transmission antenna to be equalized. It determines the position of the unity in the unit vector $e_{D(m)}$ and thus determines also the column of the inverse matrix in equation (2) which is used to obtain the equalizer filter coefficients, D denotes a transformation matrix, $U_{mn}$ denotes a diagonal matrix whose values are obtained by computing DFT of the first column of matrix $G_{mn}$, and $_{mn}$ define the position of the matrix inside a larger matrix.

The calculation is thus simplified to vector dot-products between diagonals of the diagonal sub-matrices of the inverse matrix and a column of a transformation matrix D. The column index is determined by using a value D(m). Then, inverse transforms are taken form the result vectors $p_1$ and $p_2$ (equation (4) and (9)), and finally the inverse transformed vectors are multiplied by the channel matrix:

$$w_m \approx (H_{tx1} \quad H_{tx2}) \begin{pmatrix} D^H p_1 \\ D^H p_2 \end{pmatrix}, \quad (10)$$

wherein $H_{tx1}$ denotes a channel matrix of the signal transmitted from the first antenna, $H_{tx2}$ denotes a channel matrix of the signal transmitted from the second antenna, $D^H$ denotes a complex-conjugate of a Fourier-matrix, $p_1$ and $p_2$ are obtained from equation (9).

The computation is repeated for each signal to be equalized by changing the value of m.

The embodiment ends in block 214. The embodiment may be repeated after the channel coefficients, and thus also the channel matrices, have been changed due to a fading phenomenon.

Next, another embodiment of the data processing method is described by means of FIG. 3. In this embodiment, the equalizer coefficients are obtained directly from equation (4) explained above. In this embodiment, the matrix to be inverted is formed by using the original channel matrices in equation (5) and then applying circulant approximation to the resulting matrix.

The embodiment starts in block 300. In block 302, at least one channel matrix assuming predetermined interfering signals as a part of a desired signal is created. The channel matrix creation is explained above in block 202.

In block 304, at least one block matrix is created by using the at least one channel matrix and sub-matrices of the at least one block matrix are determined. In this embodiment, matrix $$\begin{pmatrix} H_{tx1}^H H_{tx1} & H_{tx1}^H H_{tx2} \\ H_{tx2}^H H_{tx1} & H_{tx2}^H H_{tx2} \end{pmatrix}$$

is the block matrix (see equation (2)) wherein the sub-matrices to be determined are of the form $H_{txm}^H H_{txn}$.

In block 306, the sub-matrices of the at least one block matrix are diagonalized for generating at least one block-diagonalized matrix. The sub-matrices are typically $H_{txm}^H H_{txn}$ matrices determined in block 304. The sub-matrices, $H_{txm}^H H_{txn}$, are approximated as corresponding circulant matrices. The diagonalization makes the inverting for a more straightforward process.

As in the first embodiment, for the diagonalization, each sub-matrix $H_{txm}^H H_{txn}$ is usually approximated by a corresponding circulant matrix $G_{mn}$ which can then be diagonalized by using a Fourier matrix or another suitable matrix. The circulant matrix can be formed of one single row vector of an original matrix (original matrix is a submatrix of form $H_{txm}^H H_{txn}$) by circularly rotating the row vector to form other rows of the circulant matrix.

The diagonalization can be carried out by using equation:

$$H_{txm}^H H_{txn} \approx G_{mn} = D^H U_{mn} D, \quad (3)$$

wherein

D denotes a transformation matrix, such as a Fourier matrix,

H denotes a complex-conjugate transpose, $U_{mn}$ denotes a diagonal matrix whose values are obtained by computing DFT of the first column of matrix $G_{mn}$, and $_{mn}$ defines the position of the matrix inside a larger matrix.

In block 308, the at least one block-diagonalized matrix is inverted. Variance $\sigma^2$ of additive noise and interference, which was not assumed as a part of a desired signal component during the creation of the channel matrix, can be taken into account in a way analogous to that in equation (4) by adding a diagonal matrix to the block-diagonalized matrix $$\begin{pmatrix} U_{11} & U_{12} \\ U_{21} & U_{22} \end{pmatrix}.$$

The matrix to be inverted then becomes $$\begin{pmatrix} \sigma^2 I + U_{11} & U_{12} \\ U_{21} & \sigma^2 I + U_{22} \end{pmatrix}$$

(see equation (9)).

The original matrix inversion has changed into an inversion of a matrix which has only a couple of, typically three, non-zero diagonals. Thus, the inversion of the 2 M×2 M matrix can be implemented as M matrix inversions of size 2×2 where M is the dimension of the sub-matrices.

In block 310, channel equalizer coefficients are generated by using at least one inverted block-diagonalized matrix. This is typically carried out by computing the last form in equation (4) by using equation (9) as an intermediate step.

As in the first embodiment explained above, $$\begin{pmatrix} p_1 \\ p_2 \end{pmatrix} = \begin{pmatrix} \sigma^2 I + U_{11} & U_{12} \\ U_{21} & \sigma^2 I + U_{11} \end{pmatrix}^{-1} \begin{pmatrix} D & 0 \\ 0 & D \end{pmatrix} e_{D(m)} \quad (9)$$

can be computed.

Then the inverse transformed vectors are multiplied by the channel matrix:

$$w_m \approx (H_{tx1} \quad H_{tx2}) \begin{pmatrix} D^H p_1 \\ D^H p_2 \end{pmatrix}, \quad (10)$$

The computation is repeated for each signal to be equalized by changing the value of m.

It should be noted that the inverse matrix needed here is determined in block 308.

In this embodiment, $G_{mn}$ matrices are obtained by computing products $H_{txm}{}^H H_{txn}$ and then approximating the result as a circulant matrix. After that, sub-matrices, $G_{mn}$, are diagonalized by using equation (4). That is to say, equations (5)-(8) are omitted in this embodiment.

The embodiment ends in block 312. The embodiment may be repeated after the channel coefficients, and thus also the channel matrices, have been changed due to a fading phenomenon.

A generalised example of a part of a receiver depicted by FIG. 4 is now examined. It is obvious to a person skilled in the art that the receiver may also include elements other than those illustrated in FIG. 4. The receiver may be located in several kinds of communication units, such as a user terminal or a base station of a communication system, for instance a base station (node B) used in a wideband code division multiple access system (WCDMA), such as UMTS (universal mobile telecommunications system).

In this example, the receiver uses the same antenna 400 as a transmitter, and therefore a duplex filter 402 is also provided to separate transmission and reception. The antenna may be an antenna array or a single antenna. In the receiver, RF-parts 404 in this case also comprise a power amplifier, which amplifies a received signal attenuated on a radio path. Typically, RF-parts down-convert a signal to an intermediate frequency and then to a base band frequency or straight to the base band frequency. The analogue-to-digital converter 406 converts an analogue signal to digital form by sampling and quantizing.

Typical functions of a DSP-block 408 are, for example, descrambling, decoding, de-interleaving, etc. The basics of the digital signal processing are known in the art. In this embodiment, an equalizer is a part of the DSP block. The interleaver and de-interleaver are not depicted in FIG. 4 for the sake of clarity.

The embodiments of the data processing method are typically implemented as a processor and software located in a DSP processor (an equalizer), but different hardware implementations are also feasible, e.g. a circuit built of separate logics components or one or more client-specific integrated circuits (Application-Specific Integrated Circuit, ASIC). A hybrid of these implementations is also feasible.

FIG. 5 shows an example of a part of a base station. The base station is taken herein as an example of a network element. The transceiver uses the same antenna 508 for receiving and transmitting and, therefore, a duplex filter 506 is also provided to separate transmission and reception. The antenna may be an antenna array or a single antenna.

In this case, receiver RF parts 510, also comprise a power amplifier that amplifies the received signal attenuated on a radio path. Typically, RF parts down-convert a signal to an intermediate frequency and then to a base band frequency or straight to base band frequency. The analogue-to-digital converter 512 converts an analogue signal to digital form by sampling and quantizing.

A receiver and a transmitter typically share Digital Signal Processing block 500. Separate DSP-blocks could also be provided for both. Typical functions of a DSP block are for example interleaving, coding and ciphering for transmission and corresponding removal functions for reception, such as de-interleaving, decoding etc. Digital Signal Processing is known in the art. In this embodiment, the equalizer is a part of the DSP block.

In a transmitter, block 502 converts the signal into an analogue form. RF-parts in block 504 up-convert the signal to a carrier frequency. In this example, RF parts also comprise a power amplifier which amplifies the signal for a radio path.

Control block 514 controls DSP block 500. The control block may also be included into the DSP block.

The transceiver may also comprise other parts than those shown in FIG. 5.

The disclosed functionalities of the embodiments of the data processing method can be advantageously implemented by means of software which, in this embodiment, is located in a Digital Signal Processor. The equalizer is in this embodiment a part of the Digital Signal Processor. The implementation solution can also be, for instance, an ASIC (Application Specific Integrated Circuit) component. A hybrid of these different implementations is also feasible.

FIG. 6 shows a simplified example of a user terminal whereto the embodiments of the invention can be applied. The user terminal is herein taken as an example of a communication terminal. The terminal may be a mobile telephone or a microcomputer, for example, without being restricted thereto.

The terminal comprises an antenna 600 with which signals are both transmitted and received via a duplex filter.

The terminal further comprises a transmitter 602, to amplify and transmit a modulated signal to the antenna, a modulator 604 modulating the carrier wave by a data signal comprising desired information in accordance with a selected modulation method, a receiver 606 which amplifies the signal supplied from the antenna and down-converts the signal to a selected intermediate frequency or directly to base band, and a demodulator 608 demodulating the received signal to enable a data signal to be separated from the carrier wave.

The user terminal also comprises a control block 618 comprising, for example, control and calculation means for controlling the operation of the different parts of the terminal, means for processing the speech of a user or the data generated by a user, such as a digital signal processing (DSP) processor comprising, for example, channel correction functions compensating for interference in the signal caused by the radio channel, A/D converters converting an analogue signal into a digital one by sampling and quantizing the base band signal, D/A converters converting a digital signal to an analogue one by a reverse method, filters at the receiver which filter frequencies outside a desired frequency band or, which in band-restricted systems restrict the band width of the output at the transmitter, and coding and decoding means for both channel and speech coding.

In this embodiment, the equalizer is a part of the control block.

Furthermore, in spread-spectrum systems, such as wideband code division multiple access (WCDMA used in UMTS), the spectrum of the signal is spread at the transmitter by means of a pseudo-random spreading code over a wide band and despread at the receiver, in an attempt to increase channel capacity.

The control block also comprises means for arranging the signal to be transmitted and signalling information to conform with the air interface standard of the system used.

The user interface of the terminal comprises a loudspeaker or an earpiece 610, a microphone 612, a display 614 and possibly a keypad and/or a joystick or a similar device. The user interface devices communicate with the control block. In FIG. 6, is also depicted memory block 616.

The embodiments of the data processing method are typically implemented by software in the control block, but different hardware implementations are also feasible, e.g. a circuit built of separate logics components or one or more client-specific integrated circuits (Application-Specific Integrated Circuit, ASIC). A hybrid of these implementations is also feasible.

The first embodiment may also be implemented as a computer program comprising instructions for executing a computer process for creating at least one channel matrix assuming predetermined interfering signals as a part of a desired signal; dividing the at least one channel matrix into multiple sub-matrices; diagonalizing the sub-matrices by using a transformation matrix; forming at least one block-diagonalized matrix using diagonalized sub-matrices; inverting the at least one block-diagonalized matrix; and generating channel equalizer coefficients by using at least one inverted block-diagonalized matrix.

The second embodiment may also be implemented as a computer program comprising instructions for executing a computer process for creating at least one channel matrix assuming predetermined interfering signals as a part of a desired signal; creating at least one block matrix by using the at least one channel matrix and determining sub-matrices of the at least one block matrix; diagonalizing the sub-matrices for generating at least one block-diagonalized matrix; inverting the at least one block-diagonalized matrix; and generating channel equalizer coefficients by using at least one inverted block-diagonalized matrix.

Even though the invention is described above with reference to an example according to the accompanying drawings, it is clear that the invention is not restricted thereto but it can be modified in several ways within the scope of the appended claims.

The invention claimed is:

1. A method, comprising:
creating, in an apparatus for solving channel equalizer coefficients, at least one channel impulse response matrix for a plurality of transmission antennas assuming predetermined interfering signals as a part of a desired signal;
dividing the at least one channel impulse response matrix into multiple sub-matrices;
diagonalizing the sub-matrices by using a transformation matrix;
forming at least one block-diagonalized matrix using the diagonalized sub-matrices;
inverting the at least one block-diagonalized matrix; and
generating channel equalizer coefficients by using the at least one inverted block-diagonalized matrix.

2. The method of claim 1, further comprising approximating each sub-matrix to be diagonalized as a circulant matrix.

3. The method of claim 1, wherein a linear transformation matrix is a linear matrix used in a discrete Fourier Transform.

4. The method of claim 1, further comprising approximating each sub-matrix to be diagonalized as a circulant matrix and forming each circulant matrix of one single row vector of an original matrix by circularly rotating the row vector to form other rows of the circulant matrix.

5. The method of claim 1, further comprising approximating noise or interference other than the predetermined interfering signals assumed as a part of a desired signal as a white noise.

6. A method, comprising:
creating, in an apparatus for solving channel equalizer coefficients, at least one channel impulse response matrix for a plurality of transmission antennas assuming predetermined interfering signals as a part of a desired signal;
creating at least one block matrix by using the at least one channel impulse response matrix and determining sub-matrices of the at least one block matrix;
diagonalizing the sub-matrices for generating at least one block-diagonalized matrix;
inverting the at least one block-diagonalized matrix; and
generating channel equalizer coefficients by using the at least one inverted block-diagonalized matrix.

7. The method of claim 6, further comprising approximating each sub-matrix to be diagonalized as a circulant matrix.

8. The method of claim 6, further comprising approximating each sub-matrix to be diagonalized as a circulant matrix and forming each circulant matrix of one single row vector of an original matrix by circularly rotating the row vector to form other rows of the circulant matrix.

9. A computer program, embodied on a non-transitory computer readable medium, wherein the computer program when executed by a processor is configured to control the processor to perform operations comprising:
creating at least one channel impulse response matrix for a plurality of transmission antennas assuming predetermined interfering signals as a part of a desired signal;
dividing the at least one channel impulse response matrix into multiple sub-matrices;
diagonalizing the sub-matrices by using a transformation matrix;
forming at least one block-diagonalized matrix using the diagonalized sub-matrices;
inverting the at least one block-diagonalized matrix; and
generating channel equalizer coefficients by using the at least one inverted block-diagonalized matrix.

10. A computer program, embodied on a non-transitory computer readable medium, wherein the computer program when executed by a processor is configured to control the processor to perform operations comprising:
creating at least one channel impulse response matrix for a plurality of transmission antennas assuming predetermined interfering signals as a part of a desired signal;
creating at least one block matrix by using the at least one channel impulse response matrix and determining sub-matrices of the at least one block matrix;
diagonalizing the sub-matrices for generating at least one block-diagonalized matrix;
inverting the at least one block-diagonalized matrix; and
generating channel equalizer coefficients by using the at least one inverted block-diagonalized matrix.

11. An apparatus comprising:
means for creating at least one channel impulse response matrix for a plurality of transmission antennas assuming predetermined interfering signals as a part of a desired signal;
means for dividing the at least one channel impulse response matrix into multiple sub-matrices;
means for diagonalizing the sub-matrices by using a transformation matrix;
means for forming at least one block-diagonalized matrix using the diagonalized sub-matrices;
means for inverting the at least one block-diagonalized matrix; and
means for generating channel equalizer coefficients by using the at least one inverted block-diagonalized matrix.

12. An apparatus comprising:
at least one processor; and
at least one memory including computer program code,
the at least one memory and the computer program code configured, with the at least one processor, to cause the apparatus at least to
create at least one channel impulse response matrix for a plurality of transmission antennas assuming predetermined interfering signals as a part of a desired signal;
divide the at least one channel impulse response matrix into multiple sub-matrices;
diagonalize the sub-matrices by using a transformation matrix;
form at least one block-diagonalized matrix using the diagonalized sub-matrices;
invert the at least one block-diagonalized matrix; and
generate channel equalizer coefficients by using the at least one inverted block-diagonalized matrix.

13. The apparatus of claim 12, wherein the at least one memory and the computer program code are further configured, with the at least one processor, to cause the apparatus to approximate each sub-matrix as a circulant matrix for the diagonalization.

14. The apparatus of claim 12, wherein a linear transformation matrix is a linear matrix used in a discrete Fourier Transform.

15. The apparatus of claim 12, wherein the at least one memory and the computer program code are further configured, with the at least one processor, to cause the apparatus to approximate each sub-matrix as a circulant matrix for the diagonalization and to form each circulant matrix of one single row vector of an original matrix by circularly rotating the row vector.

16. The apparatus of claim 12, wherein the at least one memory and the computer program code are further configured, with the at least one processor, to cause the apparatus to approximate noise or interference other than the predetermined interfering signals assumed as a part of a desired signal as a white noise.

17. An apparatus, comprising:
at least one processor; and
at least one memory including computer program code,
the at least one memory and the computer program code configured, with the at least one processor, to cause the apparatus at least to
create at least one channel impulse response matrix for a plurality of transmission antennas assuming predetermined interfering signals as a part of a desired signal, and to create at least one block matrix by using the at least one channel impulse response matrix and determining sub-matrices of the at least one block matrix;
diagonalize the sub-matrices for generating at least one block-diagonalized matrix;
invert the at least one block-diagonalized matrix; and
generate channel equalizer coefficients by using the at least one inverted block-diagonalized matrix.

18. The apparatus of claim 17, wherein the at least one memory and the computer program code are further configured, with the at least one processor, to cause the apparatus to approximate each sub-matrix as a circulant matrix for the diagonalization.

19. The apparatus of claim 17, wherein a linear transformation matrix is a linear matrix used in a discrete Fourier Transform.

20. The apparatus of claim 17, wherein the at least one memory and the computer program code are further configured, with the at least one processor, to cause the apparatus to approximate each sub-matrix as a circulant matrix for the diagonalization and to form each circulant matrix of one single row vector of an original matrix by circularly rotating the row vector.

21. The apparatus of claim 12, the apparatus being an equalizer.

* * * * *